United States Patent
Kawamura et al.

(10) Patent No.: US 6,721,012 B2
(45) Date of Patent: Apr. 13, 2004

(54) LENS UNIT OF TV CAMERA

(75) Inventors: Hiroyuki Kawamura, Saitama (JP); Hiroshi Mizumura, Saitama (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/149,450

(22) Filed: Sep. 9, 1998

(65) Prior Publication Data
US 2003/0128288 A1 Jul. 10, 2003

(30) Foreign Application Priority Data

Sep. 12, 1997 (JP) .................................... 9-248577
Sep. 25, 1997 (JP) .................................... 9-260444
Sep. 25, 1997 (JP) .................................... 9-260445

(51) Int. Cl.$^7$ ..................... H04N 5/225; H04N 5/262; H04N 5/232
(52) U.S. Cl. ................... 348/335; 348/240.99; 348/345
(58) Field of Search ................... 348/240, 335, 348/341, 345, 358, 360, 361, 362, 240.3, 240.99; 359/696, 694, 697; 396/213, 72, 77, 90, 349

(56) References Cited

U.S. PATENT DOCUMENTS

| | | | | |
|---|---|---|---|---|
| 4,967,281 A | * | 10/1990 | Takada | 348/361 |
| 5,257,058 A | * | 10/1993 | Mabuchi | 348/358 |
| 5,349,382 A | * | 9/1994 | Tamura | 348/345 |
| 5,448,295 A | * | 9/1995 | Hirota | 348/345 |
| 5,548,371 A | * | 8/1996 | Kawahara et al. | 396/213 |
| 5,600,371 A | * | 2/1997 | Arai et al. | 348/335 |
| 5,636,062 A | * | 6/1997 | Okuyama et al. | 359/700 |
| 5,812,189 A | * | 9/1998 | Kimura et al. | 348/240 |
| 5,819,120 A | * | 10/1998 | Hamada et al. | 396/77 |
| 5,900,995 A | * | 5/1999 | Akada et al. | 359/696 |
| 5,956,461 A | * | 9/1999 | Abe et al. | 348/240.3 |
| 6,130,717 A | * | 10/2000 | Arai et al. | 348/360 |

\* cited by examiner

*Primary Examiner*—Wendy R. Garber
*Assistant Examiner*—Luong Nguyen
(74) *Attorney, Agent, or Firm*—Birch, Stewart, Kolasch & Birch, LLP

(57) ABSTRACT

A lens unit is attached to a body of a TV camera, and a main power supply of the camera body supplies power to motors that drive movable lenses of the lens unit. When the lens unit becomes unused, specifically, when the main power supply is turned off, or when the lens unit becomes detached from the camera body, a power supply switching part of the lens unit switches the power supply to an auxiliary power supply provided in the lens unit to allow the lens unit to operate. Then, a control circuit moves a focus lens and a zoom lens to an infinity end and a wide angle end, respectively, or to predetermined security positions, so as to prevent the deterioration of the operability and optical performance of the lens unit due to vibrations and shocks during transportation of the lens unit. Thereafter, the auxiliary power supply is turned off.

5 Claims, 12 Drawing Sheets

F I G. 1
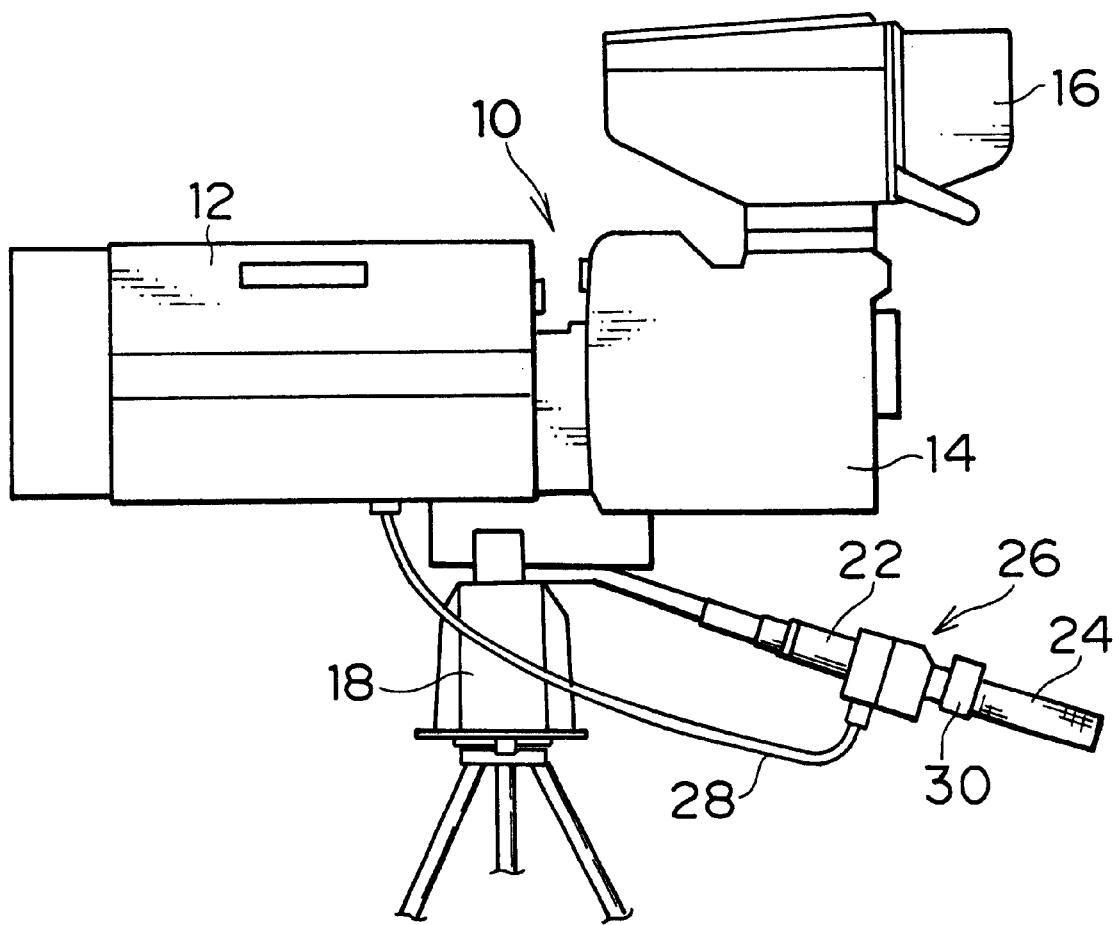

F I G. 6
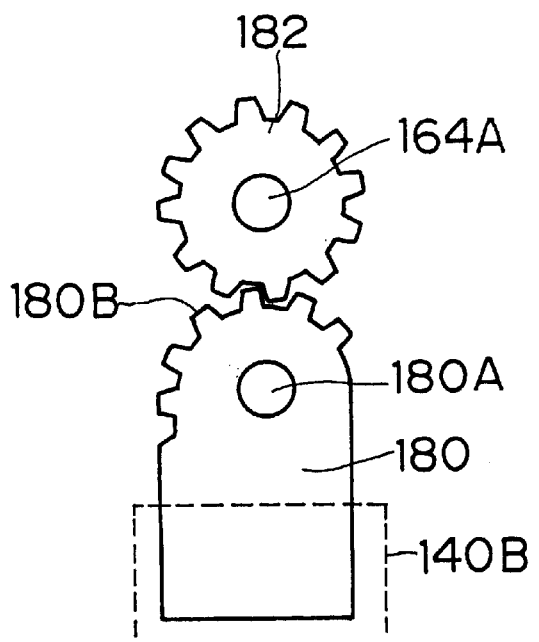
F I G. 7
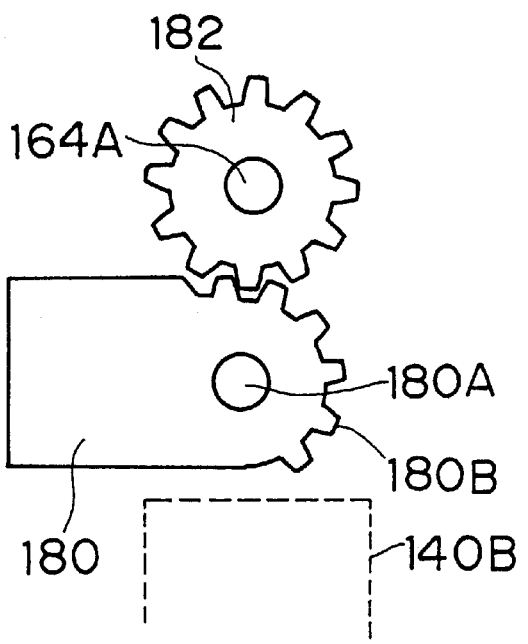

LENS UNIT OF TV CAMERA

BACKGROUND OF THE INVENTION

1. Field of the Invention

The present invention relates generally to a lens unit of a TV camera, and more particularly to a lens unit that automatically moves a movable lens to a security position when the lens unit becomes unused.

2. Description of Related Art

A detachable lens unit of a TV camera is normally disconnected from the camera after the camera is used if it is used outdoors, and the detached lens unit is housed in a container during the transportation. If the TV camera is attached to a pedestal as is the case with a TV camera that is used at a studio, the lens unit may be kept in the attached state during the transportation of the camera to a warehouse for example.

The lens unit is sometimes vibrated strongly and shocked while it is transported in the state of being housed in the container, or in the state of being attached to the camera with the pedestal. In this case, gears and cam grooves, which drive movable lenses with a motor, may become loose, deteriorating the operability and optical performance of the lens unit. Moreover, the lens unit may be broken sometimes.

SUMMARY OF THE INVENTION

The present invention has been developed under the above-described circumstances, and has as its object the provision of a lens unit of a TV camera, which prevents the deterioration of the operability and optical performance of the lens unit due to the vibrations and shocks during the transportation.

To achieve the above-mentioned object, the present invention is directed to a lens unit of a TV camera, the lens unit being attached to a camera body of the TV camera, the lens unit comprising: at least one movable lens, the movable lens being movable in a moving range during shooting; a moving means for moving the movable lens; an ascertaining means for ascertaining whether the lens unit is used or unused; and a control means for driving the moving means to move the movable lens to a predetermined position when the ascertaining means detects that the lens unit becomes unused.

According to the present invention, when it is detected that the lens unit becomes unused, the movable lens is moved to the predetermined position. To ascertain whether the lens unit is used or unused, the ascertaining means may ascertain whether a power supply of the camera body is in operation or not, or the ascertaining means may ascertain whether the lens unit is attached to the camera body or not.

The predetermined position may be within the moving range of the movable lens. The lens unit may permit looseness of positional accuracy of the movable lens at the predetermined position during shooting. The moving means may be reinforced for the predetermined position of the movable lens. If the movable lens is a focus lens, the predetermined position may be an infinity end of the moving range of the focus lens. If the movable lens is a zoom lens, the predetermined position may be a wide angle end of the moving range of the zoom lens.

The predetermined position may be outside the moving range of the movable lens. If the movable lens is the focus lens, the predetermined position may be beside the infinity end of the moving range of the focus lens. If the movable lens is the zoom lens, the predetermined position may be beside the wide angle end of the moving range of the zoom lens.

A stopper may be provided for limiting the movable range during shooting. The limitation of the stopper is released to enable the movable lens to move to the predetermined position when the ascertaining means detects that the lens unit becomes unused.

The control means may drive the moving means to move the movable lens from the predetermined position to an initial position when the ascertaining means detects that the lens unit becomes used. The initial position may be a position of the movable lens when the ascertaining means detects that the lens unit becomes unused.

An auxiliary power supply may be provided for supplying power to the lens unit when the ascertaining means detects that the lens unit becomes unused. The auxiliary power supply may be turned off when the movable lens reaches the predetermined position, or when a predetermined period of time has passed since the lens unit becomes unused. The auxiliary power supply may be one of a condenser and a secondary battery that are charged by the power supply of the camera body, or a primary battery.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a view illustrating the structure of a TV camera including a lens unit of the present invention;

FIG. 6 is a front view showing the state wherein a zoom stopper is operating;

FIG. 7 is a front view showing the state wherein the zoom stopper is not operating;

FIG. 10 is a flow chart showing a procedure for controlling the lens unit according to the second embodiment of the present invention when the power switch is turned on;

DETAILED DESCRIPTION OF THE PREFERRED EMBODIMENT

Figure 2:
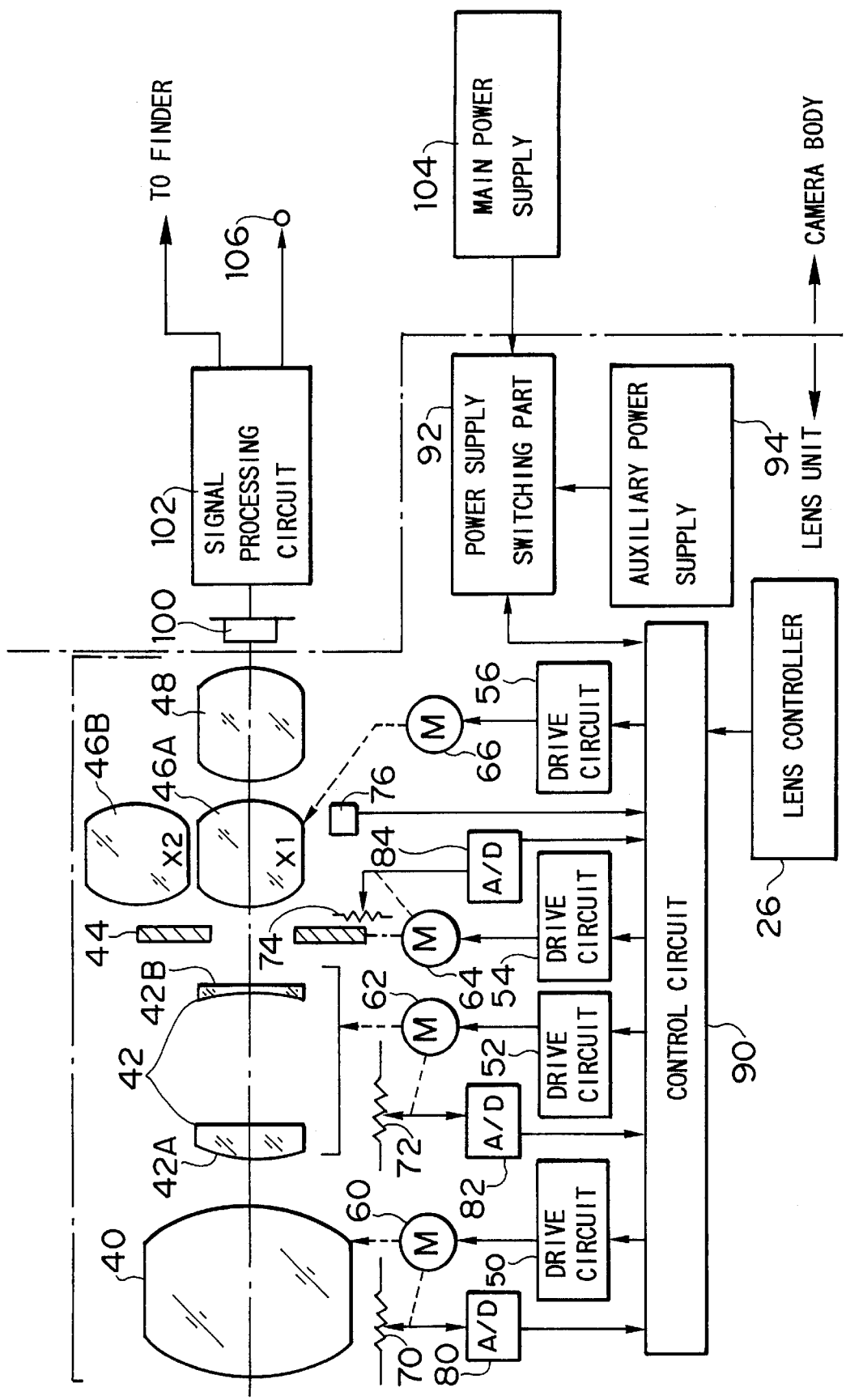
FIG. 2 is a view showing the structure of a control system of a lens unit according to the first embodiment of the present invention.

This invention will be described in further detail by way of example with reference to the accompanying drawings.

FIG. 1 shows the structure of a TV camera 10 including a lens unit 12 according to the first embodiment of the present invention. As shown in FIG. 1, the TV camera 10 includes the lens unit 12 and a camera body 14. The camera body 14 is provided with a view finder 16. The lens unit 12 is detachable from the camera body 14, and the lens unit 12 electrically connects to the camera body 14 through an interface.

The TV camera 10 is fixed on a tripod head 18, and a lens controller 26 for controlling zoom and focus is attached to a grip part 24 of a pan/tilt rod 22 and a grip part of another pan/tilt rod (not shown). The lens controller 26 connects to the lens unit 12 through a cable 28, and a user can adjust the zoom and focus by manipulating a focus demand and a zoom demand (a thumb ring 30) of the lens controller 26 while looking at a captured image on the view finder 16.

FIG. 2 shows the structure of a control system of the lens unit 12. The lens unit 12 includes optical members such as a focus lens 40, a zoom lens 42, which is composed of a variable magnification lens 42A and a correction lens 42B, a diaphragm 44, an extender lens 46A for the equal focal length, an extender lens 46B for the twice focal length, and a master lens 48; driving circuits 50–56 and drive motors 60–66 for driving the lenses and the diaphragm 44; detectors 70–76 and A/D converters 80–84 for determining the positions of the lenses and the diaphragm 44; and a control circuit 90 that controls each optical member. An imaging device 100 converts a subject image, which is formed on a light receiving surface through the optical members, into electric signals. A signal processing circuit 102 performs a predetermined signal processing for the image signals input from the imaging device 100 and outputs video signals to the view finder 16 and a video signal output terminal 106. The imaging device 100 and the signal processing circuit 102 are provided in the camera body 14.

As is well known, the variable magnification lens 42A of the zoom lens 42 changes the focal length of the lens unit 12, and the correction lens 42B corrects the focal position of the lens unit 12 in such a way that the focal position does not change. According to rotation of a zoom cam cylinder (not shown), the variable magnification lens 42A and the correction lens 42B are moved on the optical axis with a predetermined relation.

The control circuit 90 receives command signals from the lens controller 26 including such as the focus demand (a focus ring), the zoom demand (the thumb ring) and a diaphragm control. The control circuit 90 controls the movable lenses and the diaphragm 44 in accordance with the command signals from the lens controller 26.

As shown in FIG. 2, the control circuit 90 connects to a main power supply 104 of the camera body 14 through an interface (not shown) and a power supply switching part 92 of the lens unit 12. When the main power supply 104 of the camera body 14 is in operation (normal mode), the main power supply 104 supplies the power to the control circuit 90, which supplies the power to the drive circuits 50–56 and the drive motors 60–66 to actuate the drive motors 60–66.

On the other hand, the lens unit 12 is provided with an auxiliary power supply 94 that connects to the power supply switching part 92. The auxiliary power supply 94 may be any type of power supply such as a primary battery, a secondary battery and a condenser, as long as it can supply the power. If the auxiliary power supply 94 is a chargeable power supply such as the secondary battery and the condenser, the main power supply 104 charges the auxiliary power supply 94 while the main power supply 104 is in operation.

The power supply switching part 92 switches the power supply between the main power supply 104 and the auxiliary power supply 94. Specifically, when the main power supply 104 of the camera body 14 is in operation, the main power supply 104 is connected to the control circuit 90 so as to actuate the lens unit 12 including the driving circuits 50–56 and the drive motors 60–66. On the other hand, when the main power supply 104 of the camera body 14 is turned off after the camera 10 is used, the power supply is switched to the auxiliary power supply 94.

Thus, when the main power supply 104 is turned off, the control circuit 90 drives the lens unit 12 with the power from the auxiliary power supply 94. Then, the drive motors 60 & 62 are actuated to move the focus lens 40 and the zoom lens 42 to predetermined security positions that are an infinity end for focusing at infinity and a wide angle end for providing the widest angle of shot, respectively, so as to avoid harmfulness of vibrations and shocks.

An explanation will be given of the security positions where the focus lens 40 and the zoom lens 42 are positioned when the lens unit 12 is not in use. When the lens unit 12 is housed or transported, the movable lenses such as the focus lens 40 and the zoom lens 42 are preferably positioned at movement ends thereof, in other words, the positions where the movable lenses are checked. In the vicinities of the infinity end of the focus lens 40 and the wide angle end of the zoom lens 42 (actually, in the vicinities of the positions of the variable magnification lens 42A and the correction lens 42B where the variable magnification lens 42A and the correction lens 42B provide the widest angle of shot), the low positional accuracy of the focus lens 40 and the zoom lens 42 has a smaller effect on a captured image compared with a minimum object distance end and a telephoto end. If the positional accuracy of the focus lens 40 and the zoom lens 42 at the infinity end and the wide angle end were deteriorated by the strong vibrations and shocks while the lens unit 12 is transported, it would have a small effect on the operability and optical performance of the lens unit 12.

Hence, the infinity end and the wide angle end are determined as the security positions where the focus lens 40 and the zoom lens 42 are positioned when the lens unit 12 is not in use. When the main power supply 104 is turned off on completion of the shooting, the focus lens 40 and the zoom lens 42 are automatically moved to the infinity end and the wide angle end, respectively, with the power of the auxiliary battery 94. This prevents the operability and optical performance of the lens unit 12 from being deteriorated by the vibrations and shocks while the lens unit 12 is transported.

The focus lens 40 and the zoom lens 42 automatically move to the above-mentioned security positions when the main power supply 104 is turned off. This saves the user from a lot of problems and improves the reliability compared to the case when the focus lens 40 and the zoom lens 42 are moved manually before the main power supply 104 is turned off after the shooting.

Figure 3:
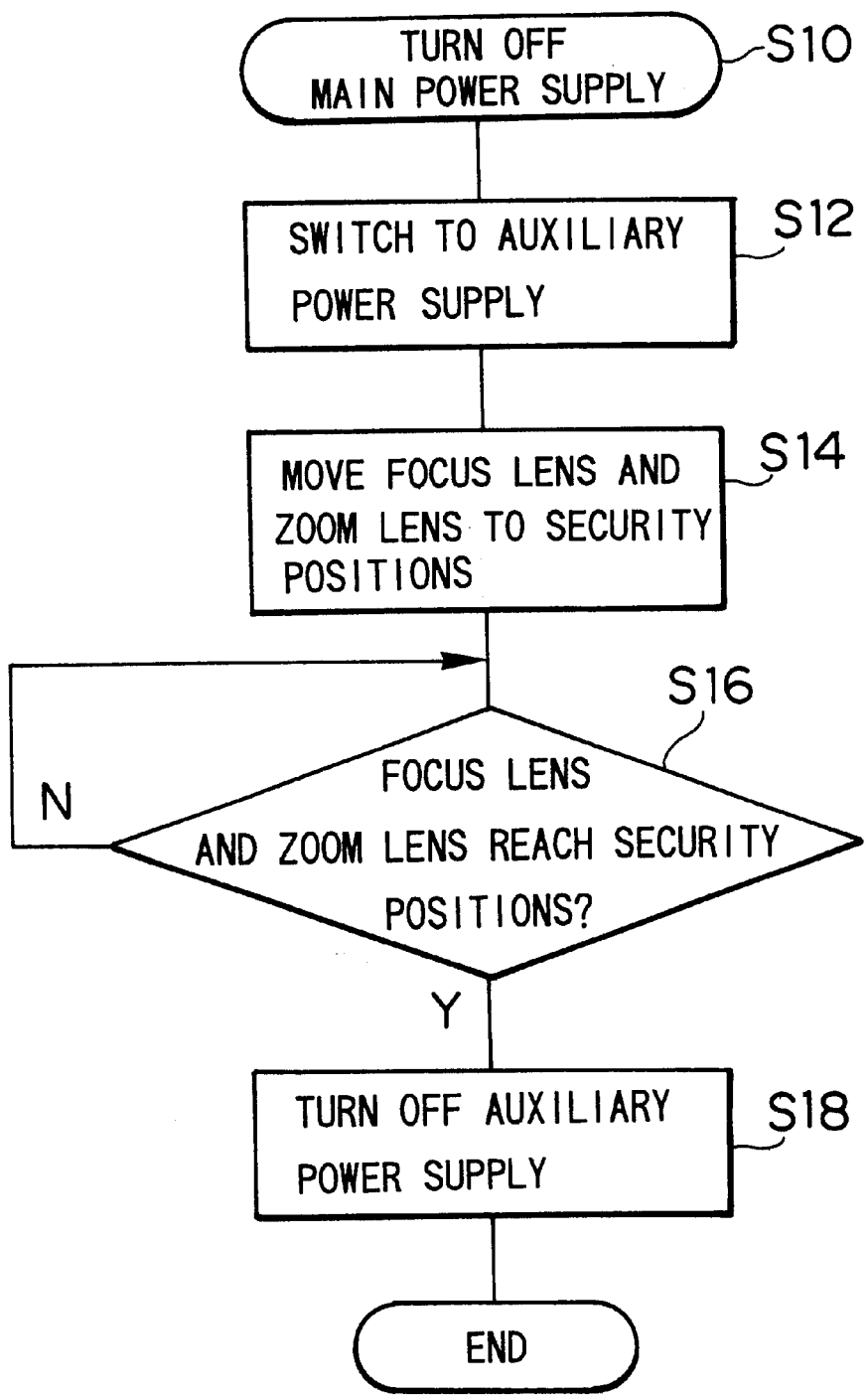
FIG. 3 is a flow chart showing a procedure for controlling the lens unit according to the first embodiment of the present invention.

A description will be given of the control of the lens unit 12 when the main power supply 104 of the camera body 14 is turned off. FIG. 3 is a flow chart showing the procedure for controlling the lens unit 12 when the main power supply 104 is turned off. The shooting is performed while the main power supply 104 is in operation. When the user turns off a switch of the main power supply 104 provided in the camera body 14, the main power supply 104 is turned off and the camera body 14 stops working (S10).

When the main power supply 104 is turned off, the power supply switching part 92 switches the power supply from the main power supply 104 to the auxiliary power supply 94, which ensures the lens unit 12 to operate (S12). The power supply switching part 92 may switch the power supply automatically with use of a relay for example, or the control circuit 90 may control the power supply switching part 92 to switch the power supply. To control the power supply switching part 92, the control circuit 90 must recognize that the main power supply 104 has been turned off. The recognition can be based on a signal from the camera body 14 as described later.

When the power supply switching part 92 switches the power supply from the main power supply 104 to the auxiliary power supply 94, the control circuit 90 detects it in view of the state of the power supply switching part 92, the signal from the camera body 14, or the like. For example, the detection is based on reception of no response signal from the camera body 14, or on reception of a signal from the camera body 14 indicating that the main power supply 94 is to be turned off.

The control circuit 90 outputs drive signals to the drive circuits 50 & 52, and runs the drive motors 60 & 62 with the auxiliary power supply 94 to thereby move the focus lens 40 and the zoom lens 42 to the infinity end and the wide angle end, respectively (S14).

Then, the control circuit 90 determines the positions of the focus lens 40 and the zoom lens 42 by means of the detectors 70 & 72 to thereby determine whether the focus lens 40 and the zoom lens 42 have reached the infinity end and the wide angle end, respectively (S16). When the control circuit 90 determines that the focus lens 40 and the zoom lens 42 have reached the infinity end and the wide angle end, respectively, the control circuit 90 stops the focus lens 40 and the zoom lens 42 and turns off the auxiliary power supply 94 (S18), and the processing is completed. To turn off the auxiliary power supply 94, the control circuit 90 may control the power supply switching part 92 to switch the power supply from the auxiliary power supply 94 to the main power supply 104, or the control circuit 90 may directly shut off the supply of the power from the auxiliary power supply 94 to the power supply switching part 92.

Thus, when the user turns off the main power supply 104 of the camera body 14, the focus lens 40 and the zoom lens 42 move automatically to their security positions; the infinity end and the wide angle end. This causes the focus lens 40 and the zoom lens 42 to stop at the security positions when the lens unit 12 is not in use. As stated above, the operability and optical performance of the lens unit 12 can be prevented from being deteriorated by the vibrations and shocks while the lens unit 12 is transported.

In the first embodiment, when the focus lens 40 and the zoom lens 42 reach the infinity end and the wide angle end, respectively, the auxiliary power supply 94 is turned off according to the command from the control circuit 90, but the present invention is not restricted to this. The auxiliary power supply 94 may be turned off automatically without the command from the control circuit 90. For example, a timer limits the time for supplying the power from the auxiliary power supply 94, and the auxiliary power supply 94 is turned off when a preset time has passed.

In the first embodiment, the auxiliary power supply 94 is used to move the focus lens 40 and the zoom lens 42 to the infinity end and the wide angle end, respectively, when the main power supply 104 is turned off, but the present invention is not restricted to this. For example, when the user turns off the switch of the main power supply 104, the lens unit 12 does not allow the main power supply 104 to be turned off until the focus lens 40 and the zoom lens 42 reach the infinity end and the wide angle end, respectively, then the focus lens 40 and the zoom lens 42 can be moved to the infinity end and the wide angle end on completion of the shooting without the use of the auxiliary power supply 94 and the power supply switching part 92.

Figure 4:
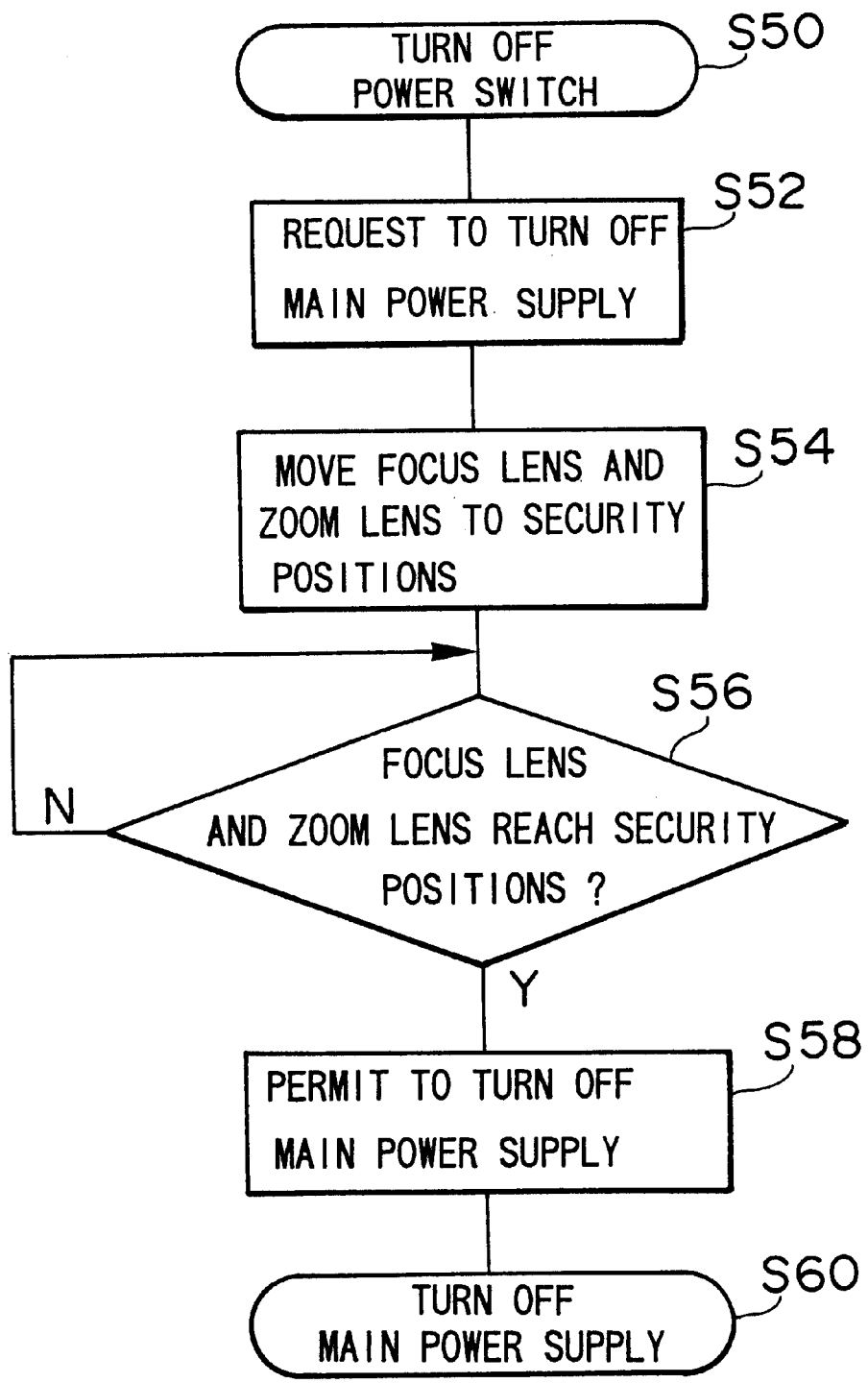
FIG. 4 is a flow chart showing another procedure for controlling the lens unit according to the first embodiment of the present invention.

FIG. 4 is a flow chart illustrating the control procedure in the above-mentioned case. When the user turns off the switch of the main power supply 104 (S50), the camera body 14 outputs a signal to the lens unit 12 to require the lens unit 12 to let the camera body 14 turn off the main power supply 104 (S52). At this time, the camera body 14 does not turn off the main power supply 104 immediately, and the camera body 14 keeps the main power supply 104 in operation until the lens unit 12 permits the main power supply 104 to be turned off.

On reception of the signal, which requires the lens unit 12 to let the main power supply 104 be turned off, the control circuit 90 of the lens unit 12 moves the focus lens 40 and the zoom lens 42 to the infinity end and the wide angle end (S54).

Then, the control circuit 90 determines whether the focus lens 40 and the zoom lens 42 have reached the infinity end and the wide angle end (S56). On detection that the focus lens 40 and the zoom lens 42 have reached the infinity end and the wide angle end, the control circuit 90 outputs a signal that permits the camera body 14 to turn off the main power supply 104 (S58).

On reception of the signal, which permits the camera body 14 to turn off the main power supply 104, from the lens unit 12, the camera body 14 turns off the main power supply 104 (S60) to stop the action of the camera 10.

As stated above, both the lens unit 12 and the camera body 14 control the turning-off of the main power supply 104, and therefore, the focus lens 40 and the zoom lens 42 can be moved to the security positions on completion of the shooting without the use of the auxiliary power supply 94, etc.

In the first embodiment, the security positions of the focus lens 40 and the zoom lens 42 are the infinity end and the wide angle end, respectively, but the present invention is not restricted to this. The security positions can be within the movable range of the focus lens 40 and the zoom lens 42 during the shooting. For example, the security positions may be positions where the moving mechanisms (e.g. gears, cam members) of the focus lens 40 and the zoom lens 42 are reinforced to resist against the vibrations and shocks. The security positions may be other positions where a relatively low positional accuracy of the focus lens 40 and the zoom lens 42 is required in view of the optical characteristics of the lens unit 12.

In the first embodiment, the focus lens 40 and the zoom lens 42 are positioned at the security positions when the lens unit 12 is not in use, but the present invention is not restricted to this. At least one of the focus lens, the zoom lens and another movable lens may be positioned to a predetermined security position when the lens unit 12 is not in use.

In the first embodiment, the lens unit 12 is detachable from the camera body 14, but the lens unit may be integrated with the camera body.

Figure 5:
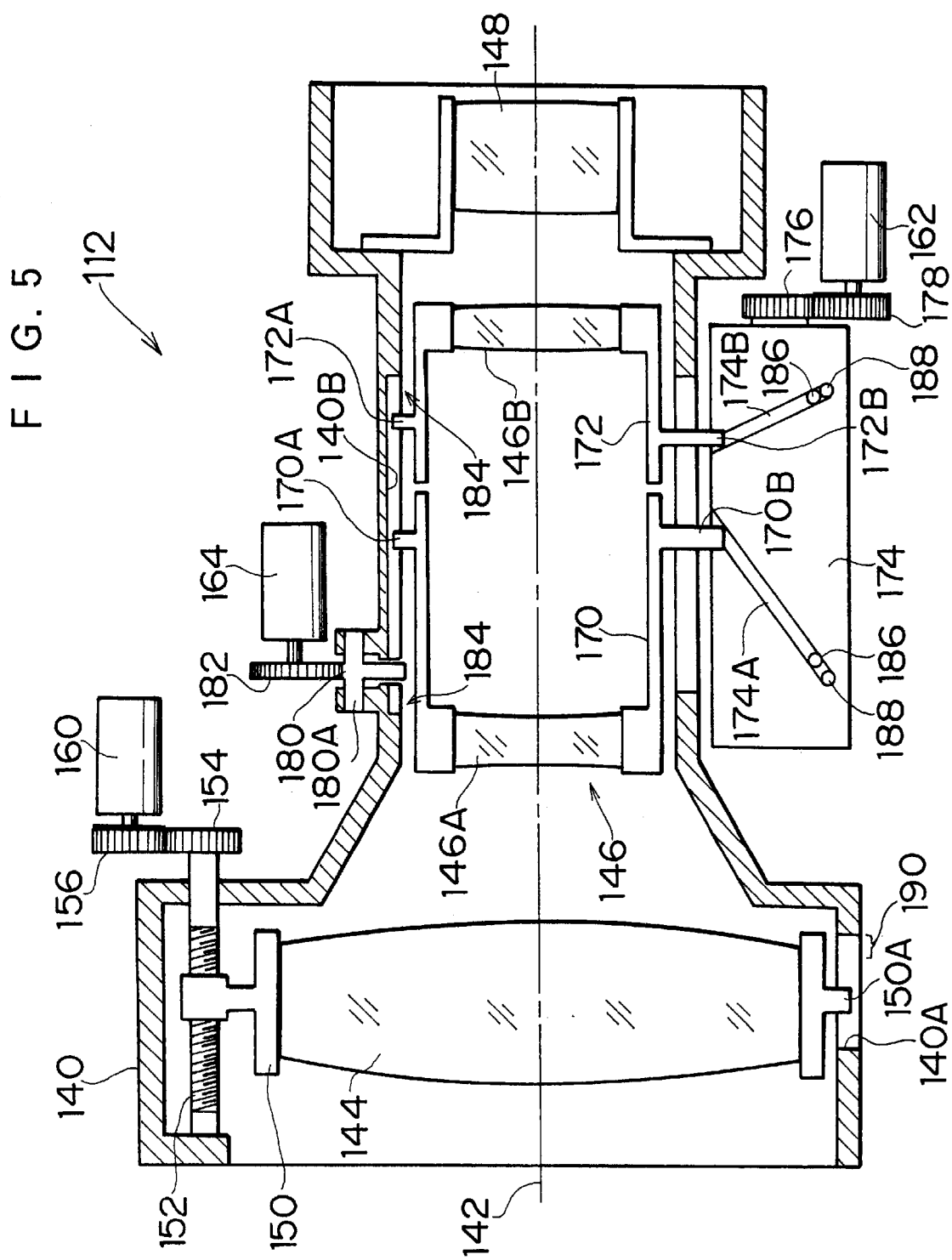
FIG. 5 is a sectional view showing the structure of an optical system of the lens unit according to the first embodiment of the present invention.

A description will be given of a lens unit according to the second embodiment of the present invention. The TV camera to which the lens unit according to the second embodiment is attached has the same structure that was previously described with reference to FIG. 1, and thus, the entire structure of the camera will not be explained. FIG. 5 is a sectional view illustrating the structure of an optical system in the lens unit 112 according to the second embodiment. As shown in FIG. 5, a focus lens 144, a zoom lens 146 composed of a variable magnification lens 146A and a correction lens 146B, and a master lens 148 are arranged in a lens barrel 140 from the front of the optical axis 142 (from the left of the drawing).

A lens frame 150 holds the focus lens 144, and a guide pin 150A is provided at the bottom end of the lens frame 150. The guide pin 150A is guided on a guide groove 140A of the lens barrel 140 along the optical axis 142. A focus drive screw 152 is rotatably attached to the top end of the lens frame 150, and a gear 154 is secured to one end of the drive screw 152. The gear 154 is engaged with a gear 156 that is secured to a rotary shaft of a drive motor 160. Running the drive motor 160 and rotating the focus drive screw 152 move the focus lens 144 along the optical axis 142.

Lens frames 170 & 172 hold the variable magnification lens 146A and the correction lens 146B, respectively, of the zoom lens 146. Guide pins 170A & 172A are provided at the top ends of the lens frames 170 & 172, and the guide pins 170A & 172A are guided on a guide groove 140B of the lens barrel 140 along the optical axis 142.

Cam followers 170B & 172B are provided at the bottom ends of the lens frames 170 & 172, and the cam followers 170B & 172B are fitted to cam grooves 174A & 174B of a zoom cam cylinder 174. A gear 176 is secured to one end of the zoom cam cylinder 174, and the gear 176 is engaged with a gear 178 that is secured to a rotary shaft of a drive motor 162.

Running the drive motor 162 rotates the zoom cam cylinder 174, causing the cam followers 170B & 172B to follow the cam grooves 174A & 174B and moving the variable magnification lens 146A and the correction lens 146B with a predetermined relation.

A zoom stopper 180 is provided on the guide groove 140B, which guides the guide pins 170A & 172A, and the zoom stopper 180 limits the movable range of the variable magnification lens 146A of the zoom lens 146 at the wide angle side. The zoom stopper 180 is supported by the lens barrel 140 in such a way as to rotate about a shaft 180A, and a gear 180B is formed on the peripheral surface of the zoom stopper 180 as shown in FIG. 6. The gear 180B is engaged with a gear 182 that is secured to a rotary shaft 164A of a drive motor 164. Running the drive motor 164 swings the zoom stopper 180 about the shaft 180A.

When the lens unit 112 is in use (when the power supply is on), the zoom stopper 180 is fixed at such a position as to project partially into the guide groove 140B, and limits the movable range of the guide pin 170A at the wide angle side as shown in FIGS. 5 and 6.

On the other hand, when the lens unit 112 is not in use (when the power supply is off, which will be described later), the zoom stopper 180 is turned with the drive motor 164 by 90° from the position shown in FIG. 6, and the zoom stopper 180 is fixed at such a position as not to project into the guide groove 140B as shown in FIG. 7. Consequently, the variable magnification lens 146A and the correction lens 146B of the zoom lens 146 are allowed to move to positions 184 beyond positions limited by the zoom stopper 180 (a wide angle end) (the positions 184 will hereinafter be referred to as security positions). Thus, the zoom lens 146 is positioned at the security position when the lens unit 112 is not in use.

The cam grooves 174A & 174B of the zoom cam cylinder 174 extend to move the zoom lens 146 from the wide angle end limited by the zoom stopper 180 (in this case, the positions of the cam followers 170B & 172B on the cam grooves 174A & 174B are shown with reference numerals 186) to the security position (in this case, the positions of the cam followers 170B & 172B on the cam grooves 174A & 174B are shown with reference numerals 188).

As is the case with the zoom lens 146, the movable range of the focus lens 144 during the shooting is limited at the infinity side. When the lens unit 112 is not in use (when the power supply is off), the focus lens 144 is positioned at the security position (in this case, the position of the guide pin 150A on the guide groove 140A is shown with a reference numeral 190) beyond the limited position at the infinity side.

Figure 8:
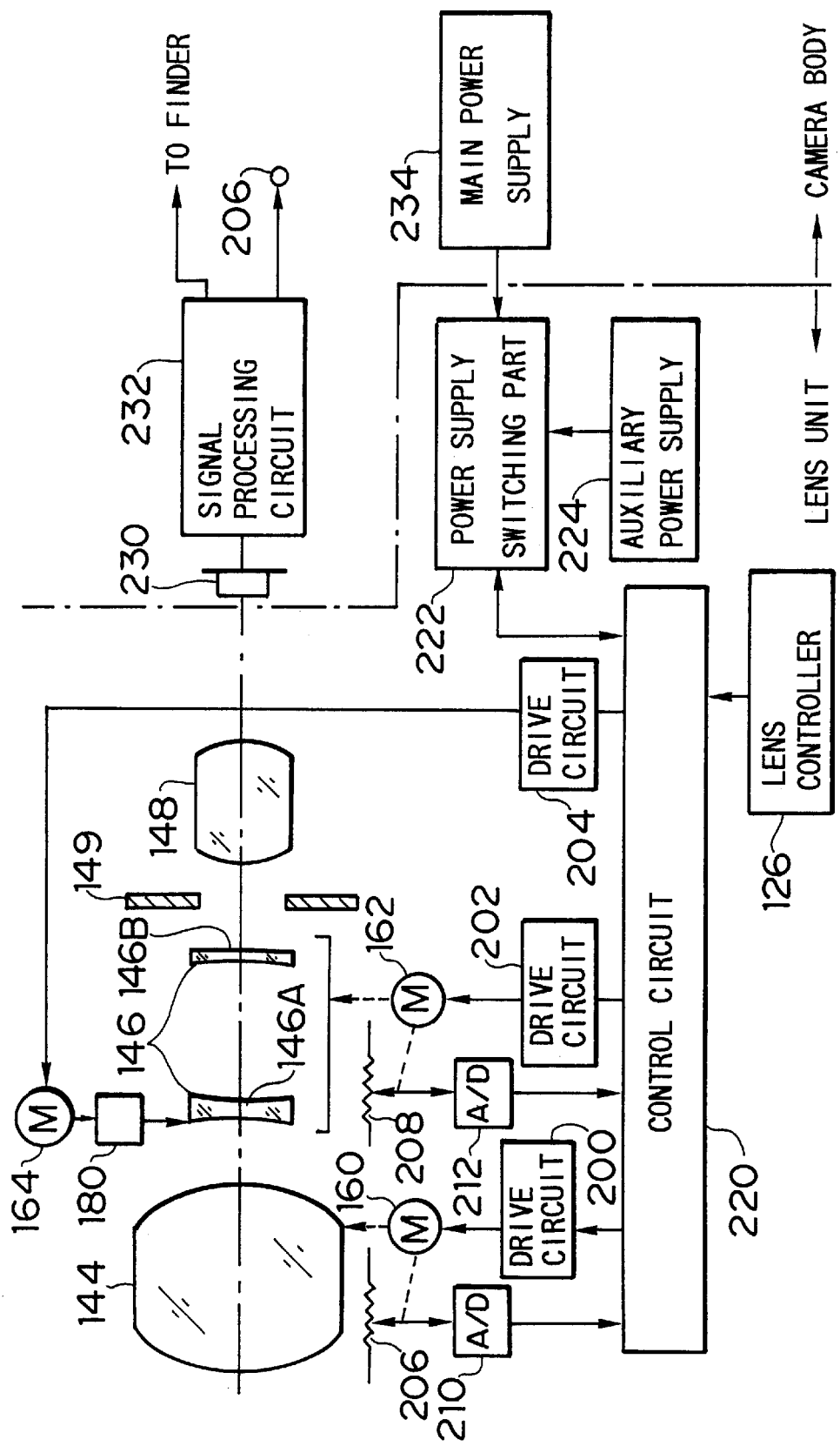
FIG. 8 is a view showing the structure of a control system of a lens unit according to the second embodiment of the present invention.

FIG. 8 shows the structure of a control system for the focus lens 144 and the zoom lens 146 of the lens unit 112. As shown in FIG. 8, the optical system of the lens unit 112 includes the optical members such as the focus lens 144, the zoom lens 146 composed of the variable magnification lens 146A and the correction lens 146B, the master lens 148 and a diaphragm 149, and the zoom stopper 180. An imaging device 230 converts a subject image, which is formed on a light receiving surface through the optical members, into electric signals. A signal processing circuit 232 performs a predetermined signal processing for the image signals input from the imaging device 230 and outputs video signals to a view finder and a video signal output terminal 206. The imaging device 230 and the signal processing circuit 232 are provided in the camera body 14.

A control system that controls the focus lens 144 and the zoom lens 146 includes drive circuits 200, 202 & 204 and the drive motors 160, 162 & 164, which drive the focus lens 144, the zoom lens 146 and the zoom stopper 180; detectors 206 & 208 and A/D converters 210 & 212, which determine the positions of the focus lens 144 and the zoom lens 146; and a control circuit 220, which controls the above-mentioned members. A description will be omitted of the structures of the master lens 148, the diaphragm 149, etc., which are also controlled by the control circuit 220.

The control circuit 220 receives command signals from a lens controller 126 including such as the focus demand (the focus ring), the zoom demand (the thumb ring) and the diaphragm control. The control circuit 220 controls the movable lenses and the diaphragm 149 in accordance with the command signals from the lens controller 126.

The control circuit 220 connects to a main power supply 234 of the camera body 14 through an interface (not illustrated) ad a power supply switching part 222 of the lens unit 122. At the time of the shooting (when the main power supply 234 of the camera body 14 is in operation), the main power supply 234 supplies the power to the control circuit 222, which supplies the power to the drive circuits 200 & 202, the drive motors 160 & 162, etc. to actuate the focus lens 144 and the zoom lens 146.

The lens unit 112 is provided with an auxiliary power supply 224 that connects to the power supply switching part 222. The auxiliary power supply 224 may be any type of power supply such as a primary battery, a secondary battery and a condenser, as long as it can supply the power. If the auxiliary power supply 224 is a chargeable power supply such as the secondary battery and the condenser, the main power supply 234 charges the auxiliary power supply 224 while the main power supply 234 is in operation.

The power supply switching part 122 switches the power supply between the main power supply 234 and the auxiliary power supply 224. Specifically, when the main power supply 234 of the camera body 14 is in operation, the main power supply 234 is connected to the control circuit 220 so as to actuate the lens unit 112 and actuate the focus lens 144, the zoom lens 146, etc. On the other hand, when the main power supply 234 of the camera body 14 is turned off after the camera 10 is used, the power supply is switched to the auxiliary power supply 224.

Thus, when the main power supply 234 is turned off, the control circuit 220 drives the lens unit 112 with the power from the auxiliary power supply 224. Then, the drive circuits 200 & 202 and the drive motors 160 & 162 are actuated to move the focus lens 144 and the zoom lens 146 to the above-mentioned security positions. At this time, the drive circuits 204 and the drive motors 164 are activated to release the limitation of the zoom stopper 180 with respect to the movable range of the zoom lens 146.

An explanation will be given of the security positions for the focus lens 144 and the zoom lens 146. As described previously, when the lens unit 112 is not in use (when the main power supply 234 of the camera body 14 is not in operation), the focus lens 144 and the zoom lens 146 are positioned at the security positions (the position of the focus lens 144 when the guide pin 150A is positioned at the position 190, and the position of the zoom lens 146 when the guide pins 170A & 172A are positioned at the positions 184 as shown in FIG. 5) at the infinity side and the wide angle side, respectively, outside their movable range for the shooting (when the main power supply 234 of the camera body 14 is in operation).

Hence, even if the focus drive screw 152 and the cam grooves 174A & 174B of the zoom cum cylinder 174 become loose due to the strong vibrations and shocks while the lens unit 112 is transported, it does not affect the movable range of the focus lens 144 and the zoom lens 146 during the shooting. It is therefore possible to prevent the deterioration of the operability and optical performances of the lens unit 112.

When the main power supply 234 is turned off, the focus lens 144 and the zoom lens 146 move automatically to the security positions. This saves the user from a lot of problems, and the lens unit 112 can be protected from the shocks during the transportation.

Figure 9:
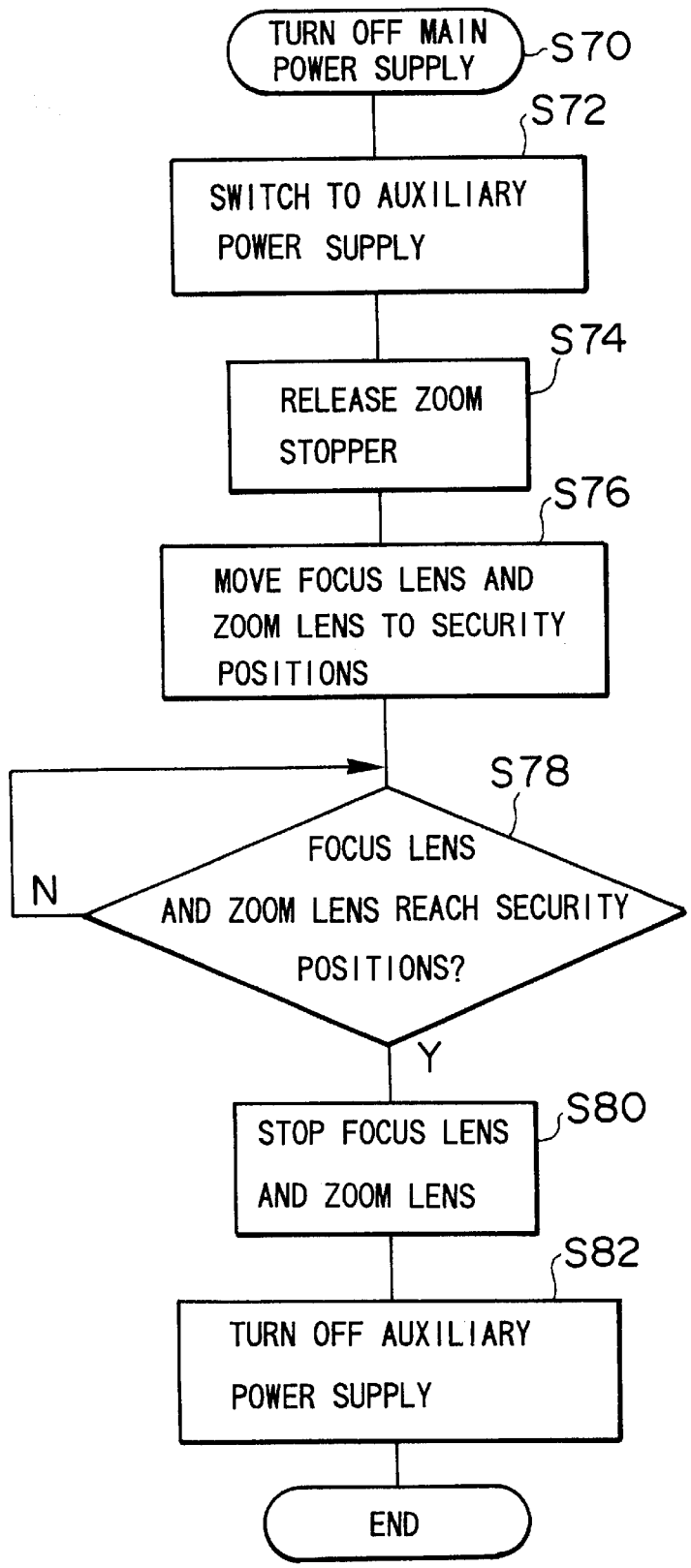
FIG. 9 is a flow chart showing a procedure for controlling the lens unit according to the second embodiment of the present invention when a power switch is turned off.

A description will be given of the control for the lens unit 112 when the main power supply 234 of the camera body 14 is turned off. FIG. 9 is a flow chart showing the procedure for controlling the lens unit 112 when the main power supply 234 of the camera body 14 is turned off. The shooting is performed while the main power supply 234 is in operation. When the user turns off a switch of the main power supply 234 provided in the camera body 14, the main power supply 234 is turned off and the camera body 14 stops working (S70).

When the main power supply 234 is turned off, the power supply switching part 222 switches the power supply from the main power supply 234 to the auxiliary power supply 224, which ensures the lens unit 112 to operate (S72). The power supply switching part 222 may switch the power supply automatically with use of a relay for example, or the control circuit 220 may control the power supply switching part 222 to switch the power supply. To control the power supply switching part 222, the control circuit 220 must recognize that the main power supply 234 has been turned off. The recognition can be based on the state of the power supply switching part 222 and a signal from the camera body 14 as described later.

When the power supply switching part 222 switches the power supply from the main power supply 234 to the auxiliary power supply 224, the control circuit 220 detects it in view of the state of the power supply switching part 222, the signal from the camera body 14, or the like. For example, the detection is based on reception of no response signal from the camera body 14, or on reception of a signal from the camera body 14 indicating that the main power supply 234 is to be turned off.

Then, the control circuit 220 outputs a drive signal to the drive circuit 204, and runs the drive motor 164 with the auxiliary power supply 224 to release the zoom stopper 180 (S74). This allows the zoom lens 146 to move to the security position.

Thereafter, the control circuit 220 outputs drive signals to the drive circuits 200 & 202, and runs the drive motors 160 & 162 with the auxiliary power supply 224 to thereby move the focus lens 144 and the zoom lens 146 to the security positions at the infinity side and the wide angle side, respectively (S76).

Then, the control circuit 220 determines the positions of the focus lens 144 and the zoom lens 146 by means of the detectors 206 & 208 to thereby determine whether the focus lens 144 and the zoom lens 146 have reached the security positions (S78). If the focus lens 144 and the zoom lens 146 have reached the security positions, the control circuit 220 stops them (S80) and turns off the auxiliary power supply 224 (S82), and the processing is completed. To turn off the auxiliary power supply 224, the control circuit 220 may control the power supply switching part 222 to switch the power supply from the auxiliary power supply 224 to the main power supply 234, or the control circuit 220 may directly shut off the supply of the power from the auxiliary power supply 224 to the power supply switching part 222.

Thus, when the user turns off the main power supply 234 of the camera body 14, the focus lens 144 and the zoom lens 146 move automatically to the security positions.

Figure 10:
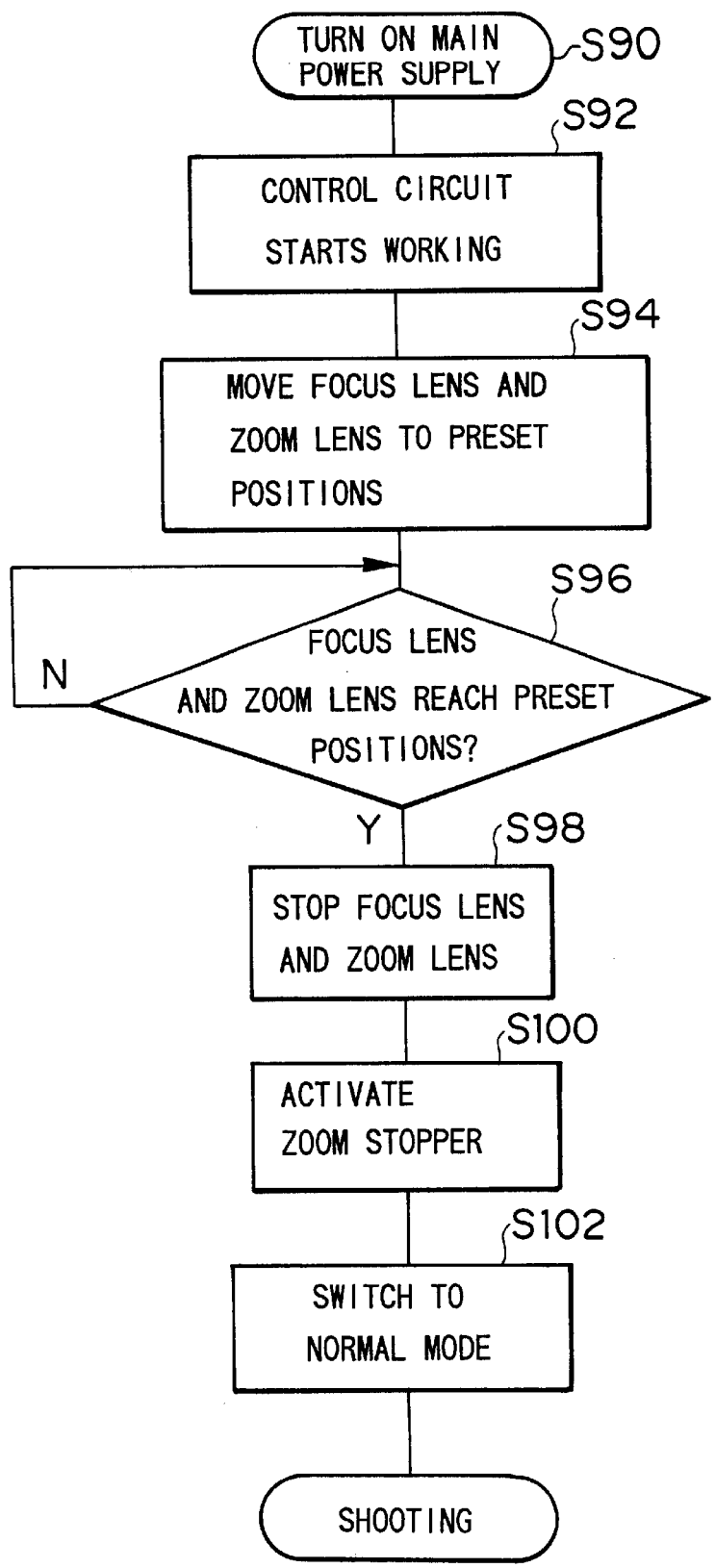

A description will be given of the control procedure when the main power supply 234 is turned on in the state wherein the focus lens 144 and the zoom lens 146 are positioned at the security positions with reference to a flow chart of FIG. 10. When the user turns on the switch of the main power supply 234 provided in the camera body 14, the main power supply 234 is turned on and the camera 10 starts operation (S90).

When the main power supply 234 is turned on, the power supply switching part 222 connects the main power supply 234 to the control circuit 220. This activates the control circuit 220 (S92), and the control circuit 220 executes the initialization of the lens unit 112 as described below.

At the start of the initialization, the control circuit 220 outputs drive signals to the drive circuits 200 & 202, and runs the drive motors 160 & 162 to move the focus lens 144 and the zoom lens 146 from the security positions to preset initial positions (S94). For example, the preset positions of the focus lens 144 and the zoom lens 146 may be the infinity end and the wide angle end, respectively, in the shooting. The user may set the preset positions with an adjuster. It is also possible to memorize, in a memory, the positions of the focus lens 144 and the zoom lens 146 as the preset positions when the main power supply 234 is turned off so that the focus lens 144 and the zoom lens 146 can return the memorized positions when the main power supply 234 is turned on.

The control circuit 220 determines whether the focus lens 144 and the zoom lens 146 have reached the preset positions with the detectors 206 & 208 (S96). If the focus lens 144 and the zoom lens 146 have reached the preset positions, the control circuit 220 stops them (S98). Thereafter, the master lens 148 may be driven by a drive mechanism (not shown) to initialize a focus.

Then, the control circuit 220 outputs a drive signal to the drive circuit 204, and runs the drive motor 164 to activate the zoom stopper 180 so as to limit the movable range of the zoom lens 146 at the wide angle side (S100).

Thus, the control circuit 220 completes the initialization of the lens unit 112, and switches to a mode for the normal shooting (a normal mode) (S102). If the control circuit 220 moves the focus lens 144 and the zoom lens 146 to the preset positions by positional control in the initialization, the control is switched to the normal control by the lens controller 126 in the normal mode, in other words, the focus lens 144 is positional-controlled and the zoom lens 146 is rate-controlled.

As a result of the above processing, the focus lens 144 and the zoom lens 146 return from the security positions to the movable range in the shooting, thus enabling the shooting.

As stated above, in the second embodiment, when the focus lens 144 and the zoom lens 146 reach the security positions after the main power supply 234 is turned off, the auxiliary power supply 234 is turned off according to the command from the control circuit 220, but the present invention is not restricted to this. The auxiliary power supply 224 may be turned off automatically without the command from the control circuit 220. For example, a timer limits the time for supplying the power from the auxiliary power supply 224, and the auxiliary power supply 224 is turned off when a preset time has passed.

In the second embodiment, the auxiliary power supply 224 is used to move the focus lens 144 and the zoom lens 146 to the security positions when the main power supply 234 is turned off, but the present invention is not restricted to this. For example, when the user turns off the switch of the main power supply 234, the lens unit 112 does not allow the main power supply 234 to be turned off until the focus lens 144 and the zoom lens 146 reach the security positions, then the focus lens 144 and the zoom lens 146 can be moved to the security positions on completion of the shooting without the use of the auxiliary power supply 224 and the power supply switching part 222.

In the second embodiment, the security positions of the focus lens 144 and the zoom lens 146 are provided beyond the infinity end and the wide angle end, respectively, but the present invention is not restricted to this. The security positions of the focus lens 144 and the zoom lens 146 may be provided beyond the minimum object distance end and the telephoto end, respectively.

In the second embodiment, the focus lens 144 and the zoom lens 146 are positioned at the security positions when the lens unit 112 is not in use, but the present invention is not restricted to this. When the lens unit 112 is not in use, at least one of the focus lens, the zoom lens and another movable lens (e.g. the master lens 148) may be positioned to a predetermined security position that is unused during the shooting.

In the second embodiment, only the zoom lens 146 is provided with the zoom stopper 180, which limits the movable range of the zoom lens 146 during the shooting, but the focus lens 144 may also be provided with a stopper that limits the movable range of the focus lens 144 during the shooting.

In the second embodiment, the lens unit 112 is detachable from the camera body 14, but the lens unit 112 may be integrated with the lens unit 12.

A description will be given of a lens unit according to the third embodiment of the present invention. The third embodiment has the same structures of the TV lens, the optical system and the zoom stopper that were described previously with reference to FIGS. 1, 5, 6 and 7, and thus, they will not be described. Parts similar to those described with reference to FIGS. 1, 5, 6 and 7 are denoted by the same reference numerals. In the second embodiment shown in FIGS. 5, 6 and 7, when the main power supply of the camera is turned off, the zoom stopper is moved to the position indicated in FIG. 7 and the movable lenses are moved to the security positions. In the third embodiment, the zoom stopper is moved to the position indicated in FIG. 7 and the movable lenses are moved to the security positions when the lens unit 112 becomes detached from the camera body 14.

Figure 11:
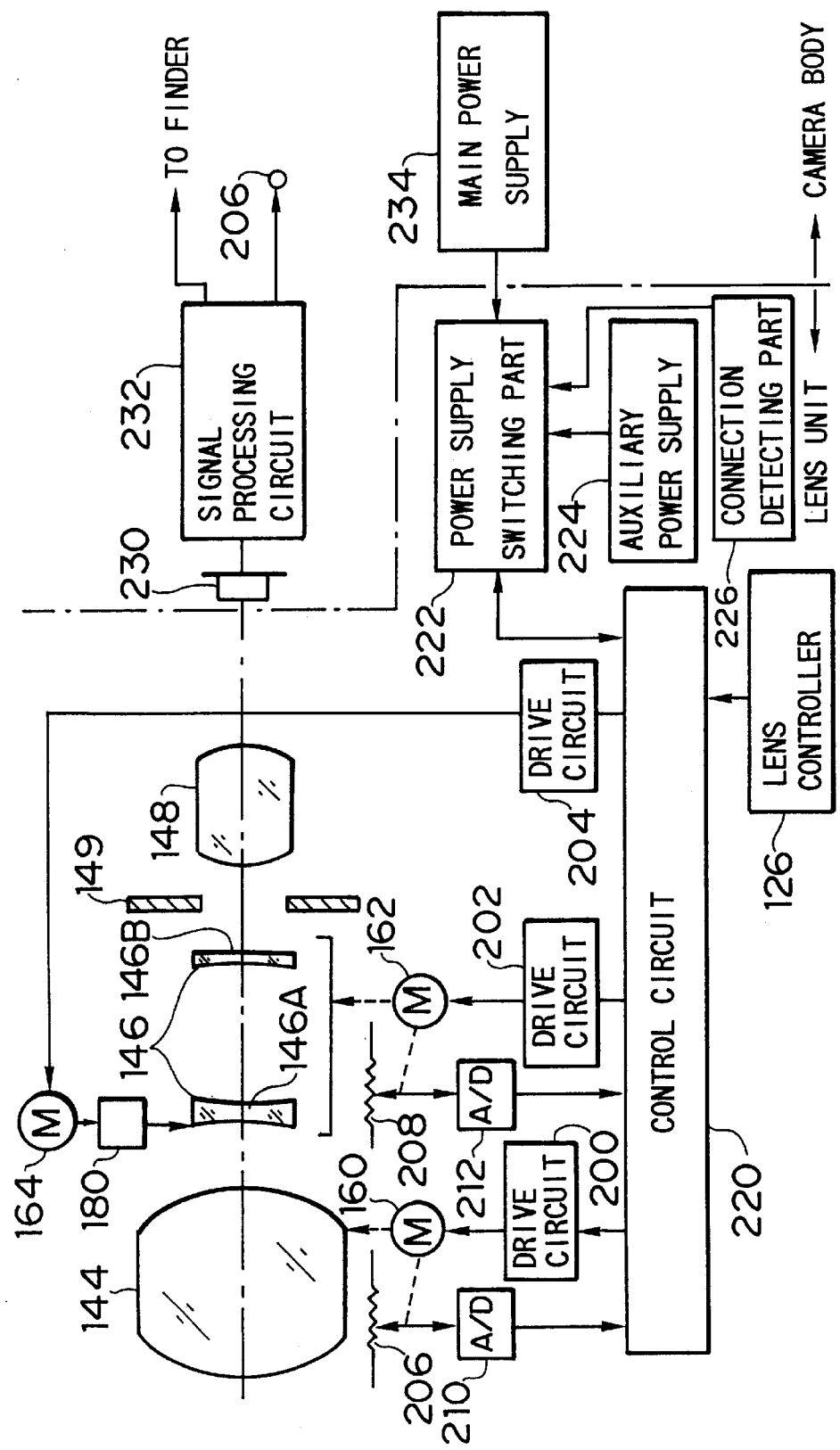
FIG. 11 is a view showing the structure of a control system of a lens unit according to the third embodiment of the present invention.

FIG. 11 shows the structure of a control system for the focus lens 144 and the zoom lens 146 of the lens unit 112 according to the third embodiment. FIG. 11 is substantially the same as FIG. 8, and a description will be given of the structure and operation that are different from those described with reference to FIG. 8. A connection detecting part 226 connects to the power supply switching part 222, which connects to the main power supply 234 of the camera body 14 and the auxiliary power supply 224 of the lens unit 112. For example, the connection detecting part 226 has a switch provided at a position where the lens unit 112 connects to the camera body 14. If the lens unit 112 is attached to the camera body 14, the switch is OFF, and if the lens unit 112 is not attached to the camera body 14, the switch is ON.

The power supply switching part 222 switches the power supply that is connected to the control circuit 220 between the main power supply 234 and the auxiliary power supply 224 in accordance with the state of the switch of the connection detecting part 226. When the switch of the connection detecting part 226 is OFF, in other words, when the lens unit 112 is attached to the camera body 14, the main power supply 234 is connected to the control circuit 220 to activate the focus lens 144, the zoom lens 146, etc. Then, when the switch of the connection detecting part 226 is turned on, in other words, when the lens unit 112 becomes detached from the camera body 14, the power supply switching part 222 connects the auxiliary power supply 224 to the control circuit 220.

Thus, when the lens unit 112 becomes detached from the camera body 14, the control circuit 220 drives the lens unit 112 with the power from the auxiliary power supply 224, and activates the drive circuits 200 & 202 and the drive motors 160 & 162, which move the focus lens 144 and the zoom lens 146 to the security positions. At this time, the drive circuit 204 and the drive motor 164 are activated to release the limitation of the zoom stopper 180 with respect to the movable range of the zoom lens 146.

When the lens unit 112 is detached from the camera body 14, the focus lens 144 and the zoom lens 146 are positioned at the security positions beyond the infinity end and the wide angle end of the movable range in the shooting (the position of the focus lens 144 when the guide pin 150A is positioned at the position 190, and the position of the zoom lens 146 when the guide pins 170A and 172A are positioned at the positions 184 as shown in FIG. 5). Hence, even if the focus drive screw 152 and the cam grooves 174A and 174B of the zoom cam cylinder 174 become loose due to the strong vibrations and shocks while the lens unit 112 is transported independently of the camera body 14, it does not affect the movable range of the Locus lens 144 and the zoom lens 146 in the shooting. It is therefore possible to prevent the deterioration of the operability and optical performance of the lens unit 112.

When the lens unit 112 becomes detached from the camera body 14, the focus lens 144 and the zoom lens 146 move automatically to the security positions. This saves the user from a lot of problems, and the lens unit 12 can be protected from the shocks during the transportation.

Figure 12:
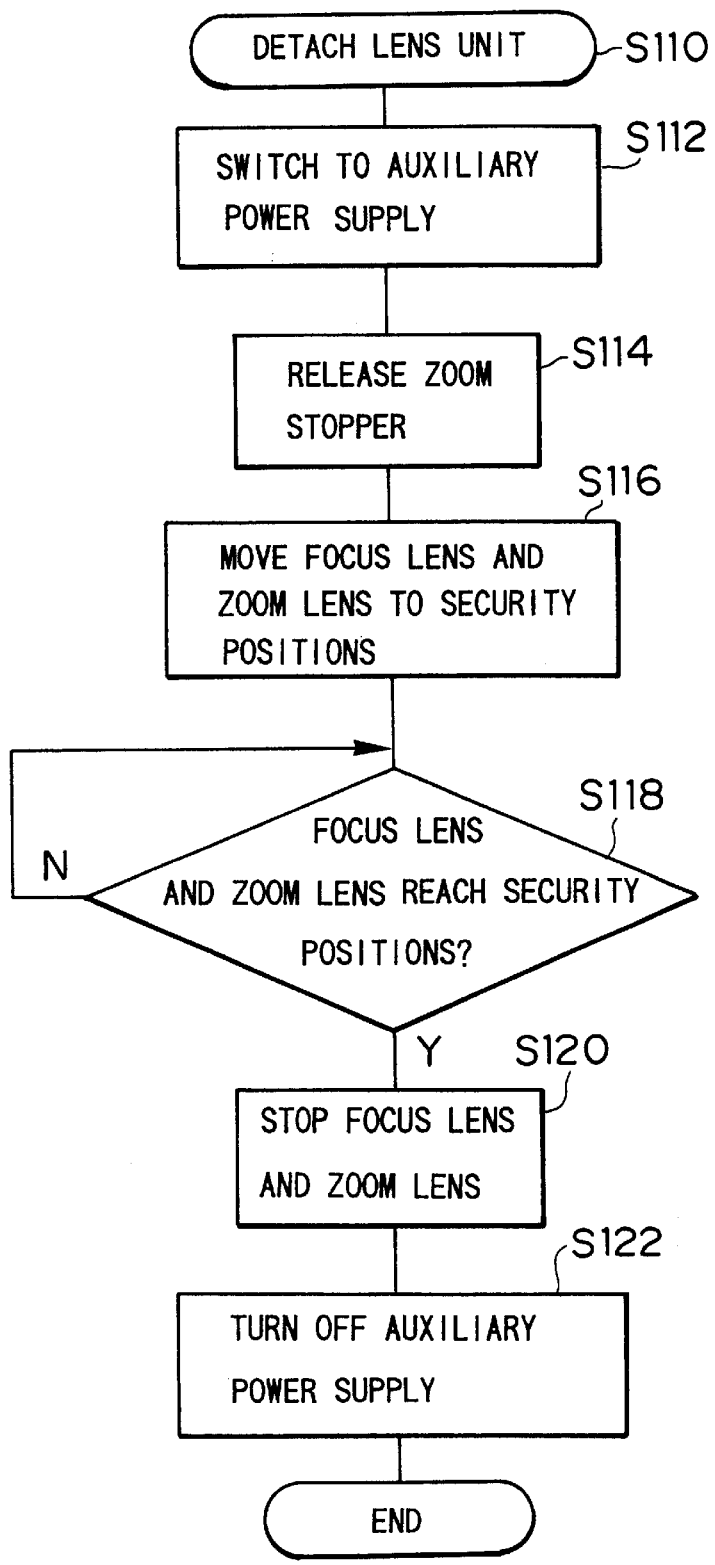
FIG. 12 is a flow chart showing a procedure for controlling the lens unit according to the third embodiment of the present invention when the lens unit is detached from a camera body.

A description will be given of the control for the lens unit 12 when it becomes detached from the camera body 14. FIG. 12 is a flow chart showing the procedure for controlling the lens unit 112 when it is detached from the camera body 14. When the lens unit 112 becomes detached from the camera body 14 on completion of the shooting (S110), the switch of the connection detecting part 226 is turned on, causing the power supply switching part 222 to switch the power supply from the main power supply 234 to the auxiliary power supply 224, which ensures the lens unit 112 to operate (S112).

When the power supply switching part 222 switches the power supply to the auxiliary power supply 224, the control circuit 220 detects it in view of the state of the power supply switching part 222 or the connection detecting part 226, the signal from the camera body 14, or the like. For example, the detection is based on reception of no response signal from the camera body 14, or on reception of a signal from the camera body 14 indicating that the main power supply 234 is to be turned off.

Then, the control circuit 220 outputs a drive signal to the drive circuit 204, and runs the drive motor 164 with the auxiliary power supply 224 to release the zoom stopper 180 (S114). This allows the zoom lens 146 to move to the security position.

Thereafter, the control circuit 220 outputs drive signals to the drive circuits 200 & 202, and runs the drive motors 160 & 162 with the auxiliary power supply 224 to thereby move the focus lens 144 and the zoom lens 146 to the security positions at the infinity side and the wide angle side, respectively (S116).

Then, the control circuit 220 determines the positions of the focus lens 144 and the zoom lens 146 by means of the detectors 206 & 208 to thereby determine whether the focus lens 144 and the zoom lens 146 have reached the security positions (S118). If the focus lens 144 and the zoom lens 146 have reached the security positions, the control circuit 220 stops them (S120) and turns off the auxiliary power supply 224 (S122), and the processing is completed. To turn off the auxiliary power supply 224, the control circuit 220 may control the power supply switching part 222 to switch the power supply from the auxiliary power supply 224 to the main power supply 234, or the control circuit 220 may directly shut off the supply of the power from the auxiliary power supply 224 to the power supply switching part 222.

Thus, when the lens unit 112 becomes detached from the camera body 14, the focus lens 144 and the zoom lens 146 move automatically to the security positions.

Figure 13:
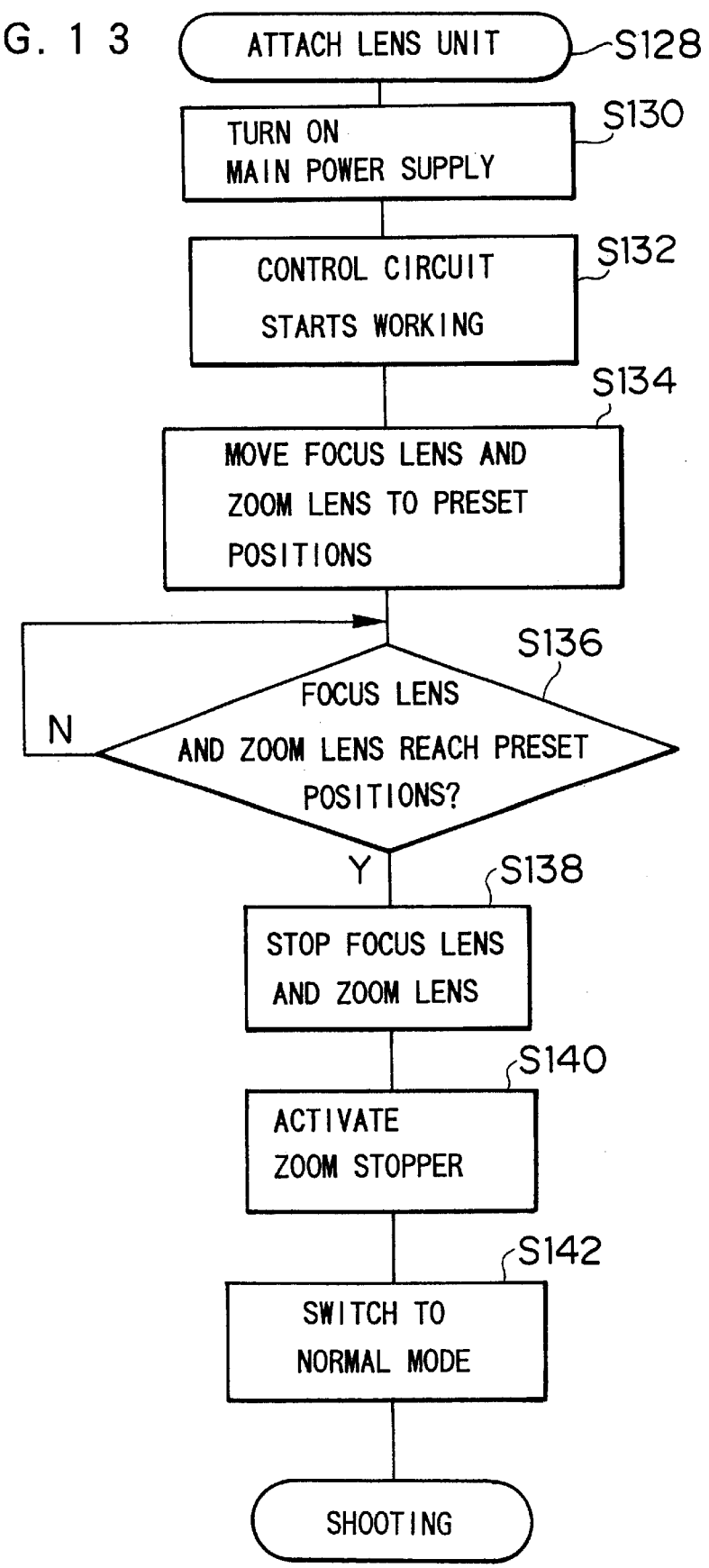
FIG. 13 is a flow chart showing a procedure for controlling the lens unit according to the third embodiment of the present invention when the lens unit is attached to the camera body.

A description will be given of the control for the lens unit 112 when the main power supply 234 of the camera body 14 is turned on after the lens unit 112 is attached to the camera body 14. FIG. 13 is a flow chart showing the procedure for controlling the lens unit 112 when the main power supply 234 of the camera body 14 is turned on after the lens unit 112 is attached to the camera body 14. When the lens unit 112 is attached to the camera body 14 (S128), the switch of the connection detecting part 226 is turned off, causing the power supply switching part 222 to connect the main power supply 234 to the control circuit 220.

When the user turns on the switch of the main power supply 234 provided in the camera body 14, the main power supply 234 is turned on to cause the camera 10 to start working (S130) and cause the control circuit 220 to start working (S132). Then, the control circuit 220 executes the initialization of the lens unit 112 as described below.

At the start of the initialization, the control circuit 220 outputs drive signals to the drive circuits 200 & 202, and runs the drive motors 160 & 162 to move the focus lens 144 and the zoom lens 146 from the security positions to preset initial positions (S134). For example, the preset positions of the focus lens 144 and the zoom lens 146 may be the infinity end and the wide angle end, respectively, in the shooting. The user may set the preset positions with an adjuster. It is also possible to memorize, in a memory, the positions of the focus lens 144 and the zoom lens 146 as the preset positions when the main power supply 234 is turned off so that the focus lens 144 and the zoom lens 146 can return the memorized positions when the main power supply 234 is turned on.

The control circuit 220 determines whether the focus lens 144 and the zoom lens 146 have reached the preset positions with the detectors 206 & 208 (S136). If the focus lens 144 and the zoom lens 146 have reached the preset positions, the control circuit 220 stops them (S138). Thereafter, the master lens 148 may be driven by a drive mechanism (not shown) to initialize a focus.

Then, the control circuit 220 outputs a drive signal to the drive circuit 204, and runs the drive motor 164 to activate the zoom stopper 180 so as to limit the movable range of the zoom lens 146 at the wide angle side (S140).

Thus, the control circuit 220 completes the initialization of the lens unit 112, and switches to a mode for the normal shooting (a normal mode) (S142). If the control circuit 220 moves the focus lens 144 and the zoom lens 146 to the preset positions by positional control in the initialization, the control is switched to the normal control by the lens controller 126 in the normal mode, in other words, the focus lens 144 is positional-controlled and the zoom lens 146 is rate-controlled.

As a result of the above processing, the focus lens 144 and the zoom lens 146 return from the security positions to the movable range in the shooting, thus enabling the shooting.

In the flow chart of FIG. 13, the focus lens 144 and the zoom lens 146 do not return to the movable range in the shooting until the main power supply 234 of the camera body 14 is turned on after the lens unit 112 is attached to the camera body 14; however, the present invention is not restricted to this. When the lens unit 112 becomes attached to the camera body 14, the focus lens 144 and the zoom lens 146 may return to the preset positions with the power of the auxiliary power supply 224 whether the main power supply 234 of the camera body 14 is in operation or not.

In the third embodiment, when the focus lens 144 and the zoom lens 146 reach the security positions after the lens unit 112 becomes detached from the camera body 14, the auxiliary power supply 234 is turned off according to the command from the control circuit 220, but the present invention is not restricted to this. The auxiliary power supply 224 may be turned off automatically without the command from the control circuit 220. For example, a timer limits the time for supplying the power from the auxiliary power supply 224, and the auxiliary power supply 224 is turned off when a preset time has passed.

In the third embodiment, the security positions of the focus lens 144 and the zoom lens 146 are provided beyond the infinity end and the wide angle end, respectively, but the present invention is not restricted to this. The security positions of the focus lens 144 and the zoom lens 146 may be provided beyond the minimum object distance end and the telephoto end, respectively.

In the third embodiment, the focus lens 144 and the zoom lens 146 are positioned at the security positions when the lens unit 112 is not in use, but the present invention is not restricted to this. When the lens unit 112 is not in use, at least one of the focus lens, the zoom lens and another movable lens (e.g. the master lens 148) may be positioned to a predetermined security position that is unused during the shooting.

In the third embodiment, only the zoom lens 146 is provided with the zoom stopper 180, which limits the movable range of the zoom lens 146 during the shooting, but the focus lens 144 may also be provided with a stopper that limits the movable range of the focus lens 144 during the shooting.

In the third embodiment, the security positions of the focus lens 144 and the zoom lens 146 are outside the movable range of the lenses in the shooting, but the present invention is not restricted to this. As is the case with the first embodiment, the security positions can be in the movable range of the focus lens 144 and the zoom lens 146 in the shooting. For example, the security positions may be positions where the moving mechanisms (e.g. gears, cam members) of the focus lens 144 and the zoom lens 146 are reinforced to resist against the vibrations and shocks. The security positions of the focus lens 144 and the zoom lens 146 may be the infinity end and the wide angle end, respectively. Specifically, in the vicinities of the infinity end of the focus lens 144 and the wide angle end of the zoom lens 146, the low positional accuracy of the focus lens 144 and the zoom 146 has a smaller effect on a captured image compared with the minimum object distance end and the telephoto end. If the positional accuracy of the focus lens 144 and the zoom lens 146 at the infinity end and the wide angle end were deteriorated by the strong vibrations and shocks while the lens unit 112 is transported, it would have a small effect on the operability and optical performance of the lens unit 112.

Consequently, providing the security positions of the focus lens 144 and the zoom lens 146 at the infinity end and the wide angle end prevents the deterioration of the operability and optical performance of the lens unit 112 due to the vibrations and shocks.

Even if the movable lenses are positioned in their movable range in the shooting when the lens unit is not in use, the focus lens 144 and the zoom lens 146 may be moved to the preset positions (e.g. the positions of the focus lens 144 and the zoom lens 146 when the lens unit 112 becomes detached form the camera body 14) when the lens unit 112 becomes attached to the camera body 14, or when the main power supply 234 of the camera body 14 is turned on after the lens unit 112 is attached to the camera body 14.

As set forth hereinabove, if the lens unit of the TV camera according to the present invention detects that the power supply of the camera body is to be turned off when the user turns off the switch of the power supply, the motor is run to move at least one of the focus lens and the zoom lens to the security position where the vibrations and shocks do not affect the operability and optical performance of the lens unit. Thus, whenever the lens unit is unused, the focus lens and/or the zoom lens are positioned at the security positions, and it is therefore possible to prevent the deterioration of the operability and optical performance of the lens unit due to the vibrations and shocks during the transportation, etc.

For example, the security positions of the focus lens and the zoom lens are the infinity end and the wide angle end, respectively. Since these positions permit a relatively large error in the positional adjustment of the lenses, the low positional accuracy of the lenses at these positions would give only a smaller effect on the operability and optical performance of the lens unit.

Since the lens unit is provided with the auxiliary power supply, the motors can be run with the power of the auxiliary power supply to move the focus lens and the zoom lens to the security positions after the power supply of the camera body has been turned off.

According to another mode, when the power supply of the TV camera is turned off, at least one of the focus lens and the zoom lens moves automatically to the security position outside its movable range in the shooting. Thus, whenever the power supply of the TV camera is not in operation, the focus lens and/or the zoom lens can be positioned at the security positions. The looseness at the security positions would not affect the operability and optical performance of the lens unit since the security positions are not used as the movable range of the lenses during the shooting. It is therefore possible to protect the lens unit from the shocks, etc. during the transportation.

According to yet another mode, when the lens unit becomes detached from the TV camera, at least one of the focus lens and the zoom lens moves automatically to the security position. Thus, whenever the lens unit is transported independently of the TV camera, the focus lens and/or the zoom lens are positioned at the security positions. This saves the user from a lot of problems, and prevents the deterioration of the operability and optical performance of the lens unit due to the shocks, etc. during the transportation.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is clamed is:

1. A lens unit for a TV camera, the lens unit being attached to a camera body of the TV camera, the lens unit comprising:
    at least one movable lens, the movable lens being movable in a moving range during a shooting operation, wherein the moving range includes any position the movable lens may be in during a shooting operation;
    means for moving the movable lens;
    means for ascertaining whether the lens unit is in an operational state; and
    means for controlling the moving means to move the movable lens to a predetermined, secure storage position if said ascertaining means detects that the lens unit is not in the operational state, wherein the predetermined, secure storage position is outside the moving range of the movable lens.

2. The lens unit of claim 1, wherein the movable lens is a focus lens, and the predetermined, secure storage position is in a position adjacent to an infinity end of the moving range of the focus lens.

3. The lens unit of claim 1, wherein the movable lens is a zoom lens, and the predetermined1 secure storage position is in a position adjacent to a wide angle end of the moving range of the zoom lens.

4. A lens unit for a TV camera, the lens unit being attached to a camera body of the TV camera, the lens unit comprising:

at least one movable lens, the movable lens being movable in a moving range during a shooting operation;

means for moving the movable lens;

means for ascertaining whether the lens unit is in an operational state;

means for controlling the moving means to move the movable lens to a predetermined, secure storage position if said ascertaining means detects that the lens unit is not in the operational state, wherein the predetermined, secure storage position is outside the moving range of the movable lens; and a stopper having a limiting position and a non-limiting position, said stopper limiting the movable range of the movable lens during the shooting operation while in said limiting position, and said stopper enabling the movable lens to move to the predetermined, secure storage position when the ascertaining means detects that the lens unit is not in the operational state and said stopper is in said non-limiting position.

5. A lens unit for a TV camera, the lens unit being attached to a camera body of the TV camera, the lens unit comprising:

at least one movable lens, the movable lens being movable in a moving range during a shooting operation, wherein the moving range includes any position the movable lens may be in during a shooting operation;

means for moving the movable lens;

means for ascertaining whether the lens unit is in an operational state; and means for controlling the moving means to move the movable lens to a predetermined, secure storage position if said ascertaining means detects that the lens unit is not in the operational state, wherein said predetennined, secure storage position is outside of the moving range of the movable lens, and wherein the controlling means drives the moving means to move the movable lens from the predetermined, secure storage position to an initial shooting position when the ascertaining means detects that the lens unit is in the operational state.

* * * * *